(12) United States Patent
Fox (10) Patent No.: US 9,102,865 B2
(45) Date of Patent: Aug. 11, 2015

(54) WELLBORE SERVICING FLUIDS COMPRISING CATIONIC POLYMERS AND METHODS OF USING SAME

(75) Inventor: Kelly B. Fox, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 1351 days.

(21) Appl. No.: 12/371,895

(22) Filed: Feb. 16, 2009

(65) Prior Publication Data

US 2010/0210482 A1 Aug. 19, 2010

(51) Int. Cl.
*C09K 8/035* (2006.01)
*C09K 8/68* (2006.01)
*C09K 8/12* (2006.01)
*C09K 8/40* (2006.01)
*C09K 8/76* (2006.01)

(52) U.S. Cl.
CPC ... *C09K 8/68* (2013.01); *C09K 8/12* (2013.01); *C09K 8/40* (2013.01); *C09K 8/76* (2013.01)

(58) Field of Classification Search
None
See application file for complete search history.

(56) References Cited

U.S. PATENT DOCUMENTS

| | | | |
|---|---|---|---|
| 4,152,274 A * | 5/1979 | Phillips et al. | 507/222 |
| 4,225,445 A | 9/1980 | Dixon | |
| 4,366,071 A | 12/1982 | McLaughlin et al. | |
| 4,374,739 A | 2/1983 | McLaughlin et al. | |
| 4,447,342 A * | 5/1984 | Borchardt et al. | 507/223 |
| 4,554,081 A * | 11/1985 | Borchardt et al. | 507/121 |
| 4,626,363 A * | 12/1986 | Gleason et al. | 507/118 |
| 5,032,295 A * | 7/1991 | Matz et al. | 507/118 |
| 5,424,284 A * | 6/1995 | Patel et al. | 507/129 |
| 5,594,095 A * | 1/1997 | Gruber et al. | 528/354 |
| 5,663,123 A * | 9/1997 | Goodhue et al. | 507/225 |
| 5,849,674 A * | 12/1998 | Fox et al. | 507/140 |
| 5,908,814 A * | 6/1999 | Patel et al. | 507/131 |
| 6,020,289 A * | 2/2000 | Dymond | 507/120 |
| 6,124,244 A * | 9/2000 | Murphey | 507/111 |
| 6,281,172 B1 | 8/2001 | Warren et al. | |
| 6,403,537 B1 * | 6/2002 | Chesser et al. | 507/120 |
| 6,476,169 B1 * | 11/2002 | Eoff et al. | 526/307.2 |
| 6,502,637 B2 * | 1/2003 | Smith | 166/294 |
| 6,921,742 B2 | 7/2005 | Smith | |
| 7,015,279 B2 | 3/2006 | Braun et al. | |
| 7,084,092 B2 * | 8/2006 | Patel et al. | 507/133 |
| 7,159,655 B2 * | 1/2007 | Ke et al. | 166/279 |
| 7,183,239 B2 | 2/2007 | Smith et al. | |

(Continued)

FOREIGN PATENT DOCUMENTS

EP  1193365 A1 * 4/2002
EP  1449862 A1   8/2004

(Continued)

OTHER PUBLICATIONS

International Search Report and Written Opinion, PCT/US10/023808, May 20, 2010, 14 pages.

(Continued)

*Primary Examiner* — John J Figueroa
(74) *Attorney, Agent, or Firm* — Conley Rose. P.C.; Rodney B. Carroll; Monte Rhodes (57) ABSTRACT

A method comprising placing a wellbore servicing fluid comprising a cationic polymer into wellbore wherein the cationic polymer has a molecular weight of from about 300,000 Daltons to about 10,000,000 Daltons. A composition comprising a wellbore servicing fluid, a cationic polymer, and a brine.

21 Claims, 10 Drawing Sheets

(56) References Cited

U.S. PATENT DOCUMENTS

| | | | |
|---|---|---|---|
| 7,205,262 B2 | 4/2007 | Schwartz et al. | |
| 7,398,824 B1* | 7/2008 | Wang et al. | 166/279 |
| 7,405,188 B2 | 7/2008 | Chen | |
| 7,576,038 B2 | 8/2009 | Smith | |
| 2003/0125215 A1* | 7/2003 | Schwartz et al. | 507/121 |
| 2004/0072695 A1* | 4/2004 | Chesser et al. | 507/100 |
| 2004/0149630 A1* | 8/2004 | Weir et al. | 209/5 |
| 2005/0067164 A1 | 3/2005 | Ke et al. | |
| 2005/0194145 A1* | 9/2005 | Beckman et al. | 166/295 |
| 2006/0029625 A1* | 2/2006 | Niebauer | 424/401 |
| 2006/0111509 A1 | 5/2006 | Braun et al. | |
| 2007/0111897 A1 | 5/2007 | Dahanayake et al. | |
| 2008/0269082 A1 | 10/2008 | Wilson et al. | |
| 2009/0062158 A1* | 3/2009 | Losasso et al. | 507/240 |

FOREIGN PATENT DOCUMENTS

| | | | |
|---|---|---|---|
| WO | 9726310 A1 | 7/1997 | |
| WO | 9821291 A1 | 5/1998 | |
| WO | WO 2005124097 A1 | 12/2005 | |
| WO | 2007058814 A2 | 5/2007 | |
| WO | 2007058814 A3 | 5/2007 | |
| WO | WO 2009029694 A1 | 3/2009 | |
| WO | WO 2009156372 A1 | 12/2009 | |

OTHER PUBLICATIONS

"Barite Mineral: Barite Analyze: Barium Sulfate: Barite Stone: Barite Packing: Barite Properties," http://web.archive.org/web/20081230150347/http://www.mineralco.net/barite/index.php, accessed Jun. 22, 2015, pp. 1-5.

Foreign communication from a related counterpart application— Australian Patent Examination Report No. 2, AU2010213822, Mar. 24, 2015, 4 pages.

* cited by examiner

WELLBORE SERVICING FLUIDS COMPRISING CATIONIC POLYMERS AND METHODS OF USING SAME

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

FIELD

This disclosure relates generally to wellbore servicing fluids. More specifically, this disclosure relates to wellbore servicing fluids comprising cationic polymers and methods of preparing and using same.

BACKGROUND

Subterranean deposits of natural resources such as gas, water, and crude oil are commonly recovered by drilling wellbores to tap subterranean formations or zones containing such deposits. Various wellbore servicing fluids are employed in drilling and preparing the wellbore and adjacent subterranean formations for the recovery of material therefrom. For example, a drilling fluid is usually circulated through the wellbore as it is being drilled. Generally, the drilling fluid may be used to cool and lubricate the drill bit, to remove drill cuttings, to condition the hole, to control wellbore pressures. Once a productive zone is encountered, the drilling fluid is commonly replaced by a Drill-In fluid, which has a role similar to that of an ordinary drilling mud, but may comprise a brine in order to minimize damage to the producing rock. Completion fluids may be used during the steps of completing the wellbore, and workover fluids may be used to perform remedial work in the wellbore.

Fluids suitable for use in a wellbore generally possess sufficient density to overcome the reservoir pressure and prevent unwanted fluid entry into the wellbore. Brines are commonly used for these purposes because their densities can be readily controlled by adjusting their compositions. In addition, such fluids may contain suspended solids for the purpose of controlling fluid loss into the rock adjacent to the wellbore.

One challenge to the use of brines in wellbore servicing is the generally low viscosity of the fluids. Higher viscosity brine-containing fluids would generally be useful for a number of reasons. For example, such fluids may find utility in controlling fluid loss as the rate at which fluid can enter the porous matrix of the reservoir rock as filtrate, during fluid loss, is proportional to the fluid viscosity. Further, such fluids may find additional utility if they are able to transport drill solids, solids trapped in the wellbore, or solid additives which again would be dependent upon the fluid viscosity. Polymers comprising hydroxyethyl cellulose (HEC) or xanthan gum have been used for thickening wellbore servicing fluids as they can dissolve in brines and produce shear thinning viscosity, as well as provide solids suspension capability and fluid loss control However, these polymers (i.e., HEC, xanthan gum) loose their thickening capacity at relatively low temperatures, thereby limiting their usefulness at temperatures exceeding about 240° F. for HEC, and 280° F. for the xanthan gum. In addition, these polymers may crosslink with multivalent cations in the brine at elevated temperatures, forming gels or precipitates. The loss of solubility of a thickener (e.g., HEC, xanthan gum) in the brine can cause formation or sand pack damage, thereby restricting the flow of hydrocarbons from the well. Thus a need exists for improved wellbore servicing fluids comprising brines and methods of using same.

SUMMARY

Disclosed herein is a method comprising placing a wellbore servicing fluid comprising a cationic polymer into wellbore wherein the cationic polymer has a molecular weight of from about 300,000 Daltons to about 10,000,000 Daltons.

Also disclosed herein is a composition comprising a wellbore servicing fluid, a cationic polymer, and a brine.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are wellbore servicing fluids comprising a cationic polymer. Also disclosed herein are wellbore servicing fluids comprising a cationic polymer and a brine. As used herein a "wellbore servicing fluid" refers to an aqueous fluid that may be placed in and/or used to prepare a wellbore or a subterranean formation for the recovery of material from the formation or wellbore. Thus, the wellbore servicing fluid may serve as, for example, a drilling fluid, work-over fluid, completion fluid, fracturing fluid, etc. It is to be understood that "subterranean formation" encompasses both areas below exposed earth and areas below earth covered by water such as sea or ocean water.

Wellbore servicing fluids comprising a cationic polymer and a brine are hereinafter referred to as cationic polymer-brine compositions (CPBC). The CPBC may be used in servicing a wellbore such as for example the CPBC may be used to control fluid loss and/or to suspend solids in a wellbore. Methods of servicing a wellbore with a CPBC will be described in more detail later herein.

In an embodiment, the CPBC comprises a cationic polymer (CP). CPs herein refer to polymers composed of positively charged and negatively charged components. A CP suitable for use in this disclosure is any CP compatible with the other components of the CPBC. Additionally, a CP suitable for use in this disclosure is further characterized by a low or negligible reactivity with polyvalent cations typically found in brines (e.g., $Ca^{+2}$, $Zn^{+2}$). In an embodiment, the CP has sufficient molecular weight to be able to impart viscosity to the brine. In such an embodiment, the CP has a molecular weight of from about 300,000 Daltons to about 10,000,000 Daltons, alternatively from about 350,000 Daltons to about 1,000,000 Daltons, alternatively from about 400,000 Daltons to about 750,000 Daltons, alternatively from about 450,000 Daltons to about 650,000 Daltons, alternatively from about 475,000 Daltons to about 550,000 Daltons, alternatively about 500,000 Daltons.

In an embodiment, the CP comprises a polyamine, alternatively a poly(allylamine), alternatively a quarternary amine, alternatively a polyalkyl ammonium halide, alternatively a poly allyl alkyl ammonium halide, alternatively a poly diallyl dimethyl ammonium chloride, or combinations thereof. In another embodiment, the CP comprises a poly allyl alkyl ammonium halide, a polyvinyl pyrrolidone, a poly vinylimidazole, or combinations thereof. The CP may be a homopolymer, alternatively a copolymer such as a copolymer of vinylamine and allylamine or a copolymer of acrylamide and allylamine. Examples of CPs suitable for use in this disclosure include without limitation poly di-allyl dimethyl ammonium chloride homopolymers (poly-DADMAC), poly DADMAC-co-allyl amine, poly DADMAC-co-vinylpyrrolidone, poly DADMAC-co-vinylimidazole, poly DADMAC-co-acrylamide, polyvinylamine, polyvinylpyrrolidone, vinylpyrrolidone-co-methacrylamide-co-vinylimidazole, or combinations thereof. CPs of the type described herein may be linear, branched or crosslinked polymers. In certain embodiments, the CP is not crosslinked.

In an embodiment, the CP comprises poly-DADMAC which is commercially available from Northaven Chemicals, SNF Inc., and Ciba Corporation. The molecular structure of poly-DADMAC is:

where n is from about 1,800 to about 62,200, alternatively from about 3,000 to about 35,000, alternatively from about 3,000 to about 30,000, alternatively n is any number sufficient to produce a cationic polymer having a molecular weight in the ranges disclosed previously herein.

In certain embodiments, the poly-DADMAC is not crosslinked. In some embodiments, the poly-DADMAC is a homopolymer. In certain embodiments, the poly-DADMAC is a copolymer. For example, a poly-DADMAC copolymer may include, but is not limited to, poly DADMAC-co-allyl amine, poly DADMAC-co-vinylpyrrolidone, poly DADMAC-co-vinylimidazole, and poly DADMAC-co-acrylamide.

In an embodiment, the CP may be present in the CPBC in an amount of from about 0.5 pound of CP per barrel of the brine (lb/BBl) to about 15 lb/BBl, alternatively from about 3 lb/BBl to about 13 lb/BBl, alternatively from about 7 lb/BBl to about 12 lb/BBl.

In an embodiment, the CPBC comprises a brine. Non-limiting examples of brines suitable for use in this disclosure include solutions of sodium bromide (NaBr), calcium bromide ($CaBr_2$), zinc bromide ($ZnBr_2$), potassium bromide (KBr), sodium chloride (NaCl), calcium chloride ($CaCl_2$), zinc chloride ($ZnCl_2$), potassium chloride (KCl), or combinations thereof.

In an embodiment, the brine comprises $CaCl_2$, alternatively $CaBr_2$, alternatively $ZnBr_2$. Examples of $CaBr_2$ and $ZnBr_2$ brines suitable for use in this disclosure include without limitation WELLBROM 14.2 and WELLBROM 19.2 respectively wherein 14.2 and 19.2 denote the density of the brine in pounds per gallon (ppg). WELLBROM 14.2 and WELLBROM 19.2 are both commercially available from Albermarle™ Corporation.

In an embodiment, the brine may have a density of from about 8.4 lb/gal to about 19.2 lb/gal, alternatively from about 9 lb/gal to about 16 lb/gal, alternatively from about 10 lb/gal to about 14.2 lb/gal. The brine may be present in the CPBC in an amount of from about 95 vol. % based upon the total volume of the CPBC to about 99.8 vol. %, alternatively from about 95.5 vol. % to about 99 vol. %, alternatively from about 96 vol. % to about 98 vol. %.

In an embodiment, the CPBC may be prepared by contacting a brine and a CP, both of the types described herein. The contacting of the brine and the CP may be carried out by any suitable means; for example, the brine and the CP may be mixed or blended using a mixer, an agitator, a stirrer, and the like. The mixing conditions (mixing rate, time period, etc.) may be determined by one of ordinary skill in the art with the aid of this disclosure. In some embodiments, after mixing, the material may be allowed to hydrate for a time period and at a temperature sufficient to dissolve the CP. Such time periods and temperatures may be selected or adjusted by one of ordinary skill in the art with the benefit of this disclosure.

In some embodiments, the CPBC may comprise additional additives as deemed appropriate by one skilled in the art for improving the properties of the fluid. Such additives may vary depending on the intended use of the fluid in the wellbore. Examples of such additives include but are not limited to fluid loss or seepage loss additives, such as clay, oil soluble resins, mica, talc, glass fibers, carbon fibers, starch, and carboxymethyl cellulose. Examples of other additives include but are not limited to pH modifiers, surfactants, emulsifiers, dispersants, corrosion inhibitors, bactericides, defoamers, formation conditioning agents, or combinations thereof. These additives may be included individually or in combination. Methods for introducing these additives and their effective amounts are known to one of ordinary skill in the art with the aid of this disclosure.

A CP suitable for use in the present disclosure may be further characterized by a high degree of solubility in a brine. Without wishing to be limited by theory, the CP will readily take on available water and dissolve into the brine. A CP suitable for use in this disclosure will display a low or negligible reactivity with the dissolved cations in the brine which may react with the CP to form a gel or precipitate.

A CPBC of the type described herein exhibits the behavior of a non-Newtonian fluid. A non-Newtonian fluid refers herein to a fluid whose flow properties are not described by a single constant value of viscosity. Thus, a log-log plot of the shear stress versus the shear rate for a non-Newtonian, shear thinning fluid has a slope of less than one. The shear rate and the shear stress are calculated from measured values of rpm and bob-displacement. The calculations are dependent upon the geometry of the rheometer. For example, in a Chandler Model 5550 Viscometer, the calculation is accomplished internally. The consistency index is the intercept of the line and the flow index is the exponent. Physically the consistency index may be equated with the fluid viscosity while the flow index may be equated with how the fluid viscosity will change as force is applied. The fluid viscosity may be determined using the calculated shear rate and shear stress as defined in Equation 1.

$$\mu = 47,880 K'[S_R^{(n'-1)}]$$ Equation 1 wherein $\mu$ is the viscosity in centipoise and K' is the consistency index in $lb/ft^2$.

In an embodiment, at a low shear rate of from about 0.1 $sec^{-1}$ to about 10 $sec^{-1}$, alternatively from about 0.5 $sec^{-1}$ to about 5 $sec^{-1}$, alternatively from about 1 $sec^{-1}$ to about 2 $sec^{-1}$ the CPBC may have a viscosity of from about 100 centipoise to about 40,000 centipoise, alternatively from about 400 centipoise to about 10,000 centipoise, alternatively from about 800 centipoise to about 6,000 centipoise at a temperature of from about 75° F. to about 500° F., alternatively from about 100° F. to about 400° F., alternatively from about 200° F. to about 350° F. As the shear rate is increased from about 3 $sec^{-1}$ to about 300 $sec^{-1}$, alternatively from about 10 $sec^{-1}$ to about 100 $sec^{-1}$, the CPBC may display shear thinning behavior at a temperature of from about 75° F. to about 500° F., alternatively from about 100° F. to about 400° F., alternatively from about 200° F. to about 300° F. Herein, shear thinning behavior refers to the material's viscosity decreasing with increasing shear rate.

In an embodiment, the CPBC has a flow index of less than 1 at a temperature of from about 75° F. to about 500° F., alternatively from about 100° F. to about 400° F., alternatively from about 200° F. to about 350° F.

A CPBC of the type described herein may be further characterized as being thermally stable at temperatures of equal to or less than about 500° F., alternatively from about 75° F. to about 450° F., alternatively from about 75° F. to about 400° F. Herein the thermal stability refers to the ability of the CPBC to produce viscosity and maintain solubility in brines in the disclosed temperature ranges.

In some embodiments, the CPBC may further comprise solid materials. Hereinafter a CPBC comprising brine, a CP, and solids all of the type described herein is referred to as a solids-containing-CPBC (SCPBC). These solids may be particulate matter added to the CPBC to alter or improve the properties of the CPBC (e.g., control fluid loss, increase density). Examples of such solids suitable for use in this disclosure include but are not limited to calcium carbonate, iron carbonate, magnesium carbonate, barite, hematite, ilmenite, or combinations thereof.

In an embodiment, solids may be present in the SCPBC in an amount of from about 1 lb/BBl to about 400 lb/BBl, alternatively about 20 lb/BBl to about 200 lb/BBl, alternatively from about 50 lb/BBl to about 100 lb/BBl.

In an embodiment, the SCPBC has a brine present in an amount of from about 53 vol. % to about 99.6 vol. % based on total volume of the SPBC, alternatively from about 74 vol. % to about 98 vol. %, alternatively from about 85 vol. % to about 95 vol. %.

In an embodiment, a CP, brine, and calcium carbonate are contacted to form an SCPBC. For example the CP may comprise poly-DADMAC which is present in an amount of from about 3 lb/BBl to about 15 lb/BBl, the brine may comprise a solution of calcium chloride which is present in an amount of from about 55 vol. % to about 98 vol. %, and the solids may comprise calcium carbonate which is present in an amount of from about 10 lb/BBl to about 380 lb/BBl. In such an embodiment, the resulting SCPBC may be characterized by the formation of a network structure that exhibits improved suspension capacity.

In another embodiment, the CP may comprise poly-DADMAC which is present in an amount of from about 3 lb/BBl to about 15 lb/BBl, the brine may comprise a solution of calcium chloride and calcium bromide which is present in an amount from about 55 vol. % to about 98 vol. %, and the solids may comprise calcium carbonate which is present in an amount of from about 10 lb/BBl to about 380 lb/BBl.

In another embodiment, the CP may comprise poly-DADMAC which is present in an amount of from about 3 lb/BBl to about 15 lb/BBl, the brine may comprise a solution of calcium bromide which is present in an amount of from about 55 vol. % to about 98 vol. %, and the solids may comprise calcium carbonate which is present in an amount of from about 10 lb/BBl to about 380 lb/BBl.

In yet another embodiment, the CP may comprise poly-DADMAC which is present in an amount of from about 3 lb/BBl to about 15 lb/BBl, the brine may comprise a solution of calcium chloride, calcium bromide, and zinc bromide which is present in an amount of from about 55 vol. % to about 98 vol. %, and the solids may comprise calcium carbonate which is present in an amount of from about 10 lb/BBl to about 380 lb/BBl.

Contacting of solids of the type described herein with the CPBC may be carried out by any suitable means. For example, the brine, CP and solids may be mixed or blended using a mixer, an agitator, a stirrer, and the like. In an embodiment, the SCPBC is formed by contacting a CP with a brine for a time period sufficient to allow for dissolution of the CP in the brine and the formation of a homogenous mixture. Solids may then be added to the homogenous mixture to form the SCPBC. In an alternative embodiment the CP, brine, and solids are simultaneously contacted to form a mixture which may then be mixed/agitated for a time period sufficient to form a homogeneous mixture. The mixing conditions (mixing rate, time period, etc.) may be determined by one of ordinary skill in the art with the aid of this disclosure.

Figure 1:
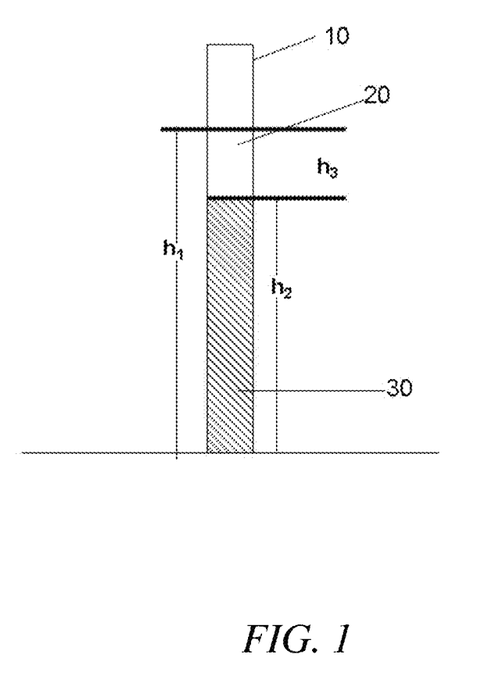
FIG. 1 is an illustration of a phase separation experiment.

The SCPBC may be characterized by an increase in the suspension capacity when compared to an otherwise similar composition prepared in the absence of a CP. The suspension capacity of the SCPBC is indicated by the sedimentation of the solids and/or by a phase separation, which is evidenced by the formation of a layer of clear brine at the surface of the fluid. The degree of phase separation may be determined by mixing solids (e.g., calcium carbonate) and a CPBC in a transparent tube to form the SCPBC and then allowing the solids to settle over time. Generally, as the solids settle in the SCPBC, clear fluid is observed near the top of the tube. For example, a tube 10 containing the SCPBC after being mixed and allowed to settle may appear as shown in FIG. 1. Referring to FIG. 1, the tube 10 has both suspended solids 30 and clear fluid 20. The degree of phase separation is calculated by dividing the height of the clear fluid (i.e., $h_3$ or $h_1$-$h_2$) by the total height of the fluid (i.e., $h_1$) and multiplying by 100%. In an embodiment, the SCPBC has a degree of phase separation of from about 0% to about 60%, alternatively from about 1% to about 30%, alternatively from about 2% to about 10% after a time period of from about 2 hours to about 14 days, alternatively from about 4 hours to about 7 days, alternatively from about 6 hours to about 24 hours.

In an embodiment, an SCPBC exhibits the behavior of a non-Newtonian fluid as described previously herein. In an embodiment, at a low shear rate of from about 0.1 $sec^{-1}$ to about 10 $sec^{-1}$, alternatively from about 0.5 $sec^{-1}$ to about 5 $sec^{-1}$, alternatively from about 1 $sec^{-1}$ to about 2 $sec^{-1}$ the SCPBC may have a viscosity of from about 100 centipoise to about 40,000 centipoise, alternatively from about 400 centipoise to about 10,000 centipoise, alternatively from about 800 centipoise to about 6,000 centipoise at a temperature of from about 75° F. to about 500° F., alternatively from about 100° F. to about 400° F., alternatively from about 200° F. to about 350° F. As the shear rate is increased from about 3 $sec^{-1}$ to about 300 $sec^{-1}$, alternatively from about 10 $sec^{-1}$ to about 100 $sec^{-1}$, the SCPBC may display a shear thinning behavior at a temperature of from about 75° F. to about 500° F., alternatively from about 100° F. to about 400° F., alternatively from about 200° F. to about 300° F.

In an embodiment, the SCPBC comprising the CP, brine, and the solids of the type described herein (e.g., calcium carbonate) is effective as a fluid loss control agent. Specifically, the SCPBC may have a fluid loss filtrate volume of from about 0 ml to about 60 ml, alternatively from about 0 ml to about 30 ml, alternatively from about 0 ml to about 20 ml after a time period of about 30 minutes, as determined in accordance with API RP 13B.

The CPBC and/or SCPBC comprising a CP of the type disclosed herein may be employed in oil field operations. In particular, the CPBC and/or SCPBC can be placed into a wellbore and used to service the wellbore in accordance with procedures known to those skilled in the art. For example, the CPBC and/or SCPBC may be used to drill, prepare, complete, maintain, or enhance a wellbore for the production of hydrocarbons in a subterranean formation penetrated by the wellbore. In an embodiment, the CPBC and/or SCPBC are prepared at the wellsite. For example the CP may be mixed with the other CPBC and/or SCPBC components on the surface and then placed downhole. Alternatively, the CPBC and/or SCPBC is prepared offsite and transported to the use site before being placed downhole.

In an embodiment, the CPBCs may be used as completion fluids, work-over fluids, spacer fluids, and liquid plugs. For example, as completion fluids, the CPBC can be placed in the well to facilitate final operations prior to initiation of production. The CPBC can be used to control a well should downhole hardware lose integrity, without damaging the producing formation or completion components. The CP may be included in the CPBC prior to the fluid being placed downhole in a single stream embodiment. Alternatively, the CP may be mixed with the other components of the CPBC during placement into the wellbore for example in a two-stream process wherein one stream comprises the CP and a second stream comprises brine. In an embodiment, the brine and CP are introduced to the wellbore in separate streams and the CPBC is formed downhole. In an embodiment, the CP is placed downhole where it contacts a naturally-occurring brine present in the formation and forms a CPBC in situ.

The relatively low viscosity produced by the CPBC at high shear rates as described previously herein suggests that the fluid can flow in the pipe and annulus without the use of excessive friction pressures. Thus, the low viscosity of the CPBC at high shear rates may allow for easy pumping of the composition and may facilitate its use as a circulation fluid during wellbore drilling. At low shear rates the high viscosity of the CPBC may allow the composition to function as a fluid loss control agent. As work-over fluids, the CPBC can be used to repair or stimulate an existing production well for restoring, prolonging, or enhancing the production of hydrocarbons.

In an embodiment, the SCPBCs may be used as drilling fluids, gravel packing fluids, fracturing fluids, fluid loss control fluids, lost circulation control fluids, suspension agents, or combinations thereof. For example, as a drilling fluid the SCPBC can be circulated down through a hollow drill stem and out through a drill bit attached thereto while rotating the drill stem to drill the wellbore. The drilling fluid can be flowed back to the surface via the annular space between the drill string and the wellbore to deposit a filter cake on the walls of the wellbore and to carry drill cuttings to the surface. The CP may be included in the SCPBC prior to the fluid being placed downhole in a single stream embodiment. As fluid loss control agents, the SCPBC can be used to control or lower the loss of fluid through a leakage and/or absorption to the formation (e.g., excessive loss of fluid from the filter cake into the subterranean formation). Fluid loss, which often occurs in a wellbore, may lead to severe problems. For example, an excessive amount of filter cake may build-up on the walls of the wellbore, causing the drill pipe to become lodged and may be difficult to remove from the wellbore.

In addition, the relatively high viscosity produced by the SCPBC in the low shear rate range as described previously is useful for suspending the solids and providing fluid loss control. Similarly to the CPBC, the relatively low viscosity produced by the SCPBC at high shear rates suggests that fluid flow in the pipe and annulus (e.g., during circulation of the fluid) can be achieved without excessive friction pressures.

In certain embodiments, the method of using the CPBC may also include servicing the wellbore with a wellbore servicing fluid. Furthermore, the method may also include extracting oil from the wellbore after servicing. As noted, certain embodiments present distinct advantages in improving the wellbore and may influence the efficiency of the well.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Sample Preparation

In the following example, all samples were prepared using the following general procedure, unless otherwise indicated. Samples were prepared by blending brine and a CP using an LR400D overhead stirrer, which is commercially available from Yamato Scientific America Inc. The samples were then allowed to hydrate overnight or longer before testing. Afterwards, if the samples remained grainy in appearance, a brief final stirring of about 30 seconds was carried out using a hand held mixer, which is commercially available from Braun.

Rheological properties were determined using a Chandler Model 5550 viscometer, with an $R_1/B_1$ rotor-bob configuration. The viscometer was programmed to run a shear rate ramp at ambient temperature (75° F.) with 50° F. intervals and a final temperature of 350° F. Nitrogen pressure was applied at 320 psi. The ramps included viscosity measurements at rotational speeds of 0.59 rpm to 300 rpm. The heat-up period between ramps was about 8 minutes. The samples were then held at test temperature for about 11 minutes during the ramp.

Example 1

The solubility, thermal stability, and rheological properties of a CP in a $CaCl_2$ brine were investigated. The $CaCl_2$ salt used was 95% $CaCl_2$ mini pellets commercially available from Cal-Chlor Corp., and the cationic polymer used was a poly-DADMAC, which is commercially available from Northaven Chemicals. Sample 1 was prepared using 10.5 lb/BBl poly-DADMAC to thicken a 11.6 ppg $CaCl_2$ brine. Specifically, 0.20 g of calcium hydroxide was dispersed into 210 g of deionized water and 140 g of $CaCl_2$ salt was added until the fluid became translucent. Next, 7.5 g of poly-DADMAC was slowly added and the mixture was stirred for 15 minutes and then allowed to hydrate overnight prior to testing.

Figure 2:
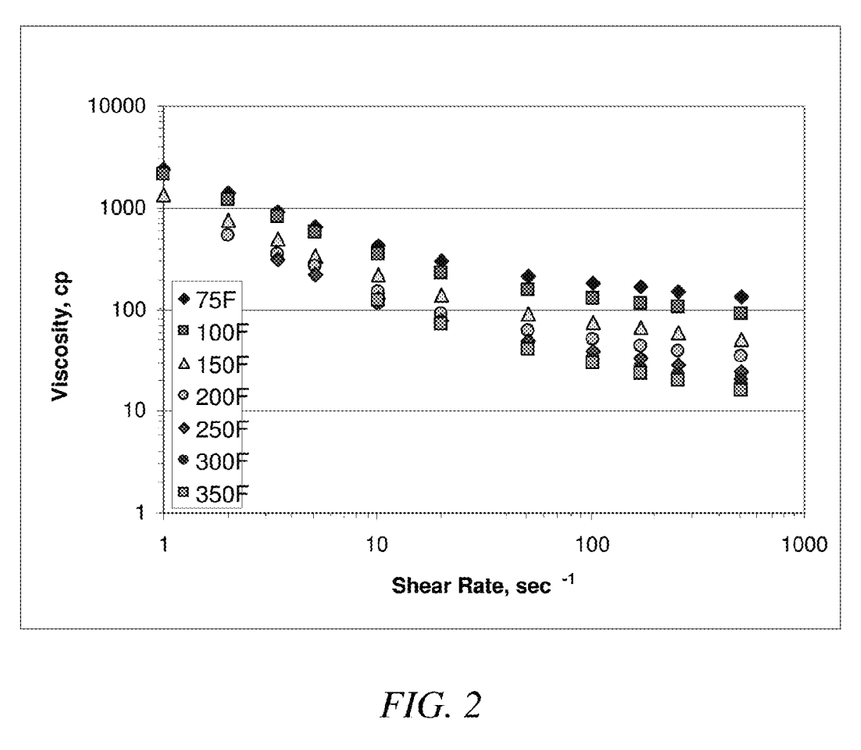
FIG. 2 is a plot of viscosity as a function of shear rate for the samples from Example 1.
Figure 3:
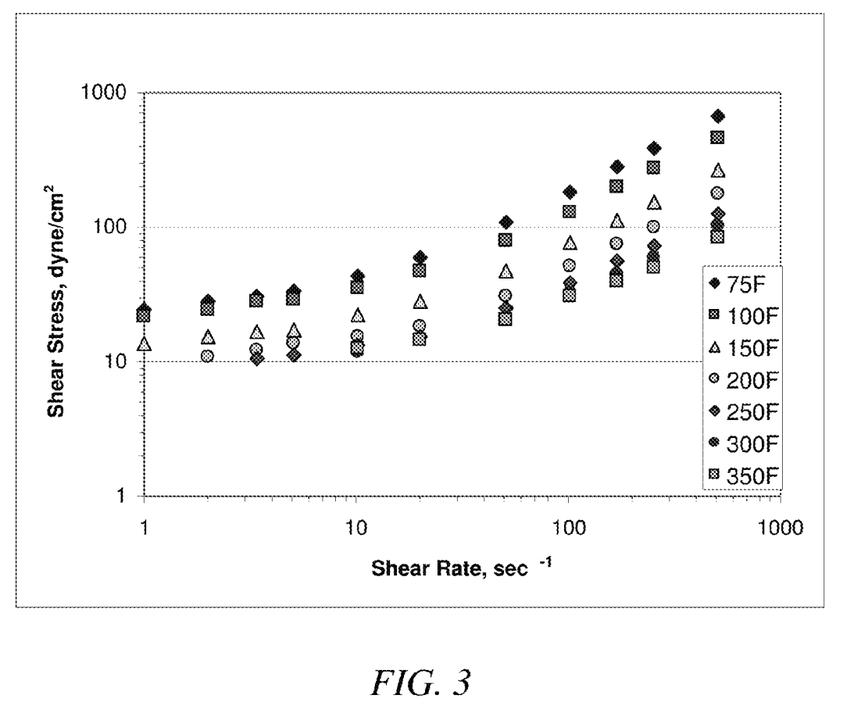
FIG. 3 is a plot of shear stress as a function of shear rate for the samples from Example 1.

Rheological testing was performed and the results are shown in FIGS. 2 and 3. FIG. 2 is a plot of viscosity as a function of shear rate at various temperatures. Referring to FIG. 2, the CP in brine produced viscosities ranging from about 20 to about 2500 cP depending on the shear rate. At all temperatures, the fluid viscosity displayed shear thinning behavior. FIG. 3 is a plot of shear stress as a function of shear rate at various temperatures. Referring to FIG. 3, a shift in the slope was observed at shear rates between 10 and 20 $sec^{-1}$ at all temperatures. This observed shift suggested the dominant polymer-polymer interactions differ between low and high shear rates. The Flow Index (n') and Consistency Index (K') were estimated separately for both the low and high shear rates regions by curve fitting the data, using a Power Law model, wherein the flow index was the slope and the consistency index was the intercept. The results are tabulated in Table 1.

TABLE 1

| Temperature (° F.) | Low Shear Rate | | High Shear Rate | | Viscosity (1 $sec^{-1}$) | Viscosity (170 $sec^{-1}$) |
| --- | --- | --- | --- | --- | --- | --- |
| | n' | K' | n' | K' | | |
| 78 | 0.1964 | 0.0509 | 0.7508 | 0.0125 | 2,436 | 167 |
| 100 | 0.1865 | 0.0455 | 0.7156 | 0.0106 | 2,19 | 118 |
| 150 | 0.2003 | 0.0278 | 0.7015 | 0.0066 | 1,330 | 68 |
| 200 | 0.2149 | 0.0196 | 0.7010 | 0.0044 | 939 | 45 |
| 250 | 0.2113 | 0.0170 | 0.7006 | 0.0032 | 814 | 33 |
| 300 | 0.3602 | 0.0106 | 0.6844 | 0.0029 | 509 | 27 |
| 350 | 0.3115 | 0.0125 | 0.5949 | 0.0041 | 596 | 24 |

Referring to Table 1, the flow indices in the lower shear rate region suggested that the CP in $CaCl_2$ brine displayed suspension capacity even up to 350° F.

Example 2

The ability of a CP to thicken $CaBr_2$ and $ZnBr_2$ brines were investigated and compared the behavior of a CP and a $CaCl_2$ brine. Three samples, designated Samples 2-4 were prepared using 10.5 lb/BBl poly-DADMAC to thicken 11.6 ppg $CaCl_2$ brine, 13.2 ppg $CaBr_2$ brine, and 19.2 ppg $ZnBr_2$ brine, respectively. All samples were then allowed to hydrate overnight prior to testing and rheological testing was performed. The results are presented in Table 2.

TABLE 2

| Temperature (° F.) | Sample 2 Viscosity (170 $sec^{-1}$) | Sample 3 Viscosity (170 $sec^{-1}$) | Sample 4 Viscosity (170 $sec^{-1}$) |
| --- | --- | --- | --- |
| 78 | 247 | 226 | 265 |
| 100 | 193 | 173 | 166 |
| 150 | 109 | 103 | 78 |
| 200 | 74 | 71 | 50 |
| 250 | 52 | 51 | 36 |
| 300 | 37 | 38 | 28 |
| 350 | 26 | 27 | 22 |

Referring to Table 2, Samples 2-4 displayed comparable viscosities over the temperature ranges investigated. Normal thermal thinning was observed for each sample during the heat-up to 350° F. and no indication of polymer crosslinking or precipitation was observed. After the test, Samples 2-4 were cooled to ambient temperature and the samples recovered were clear, colorless viscous solutions.

Example 3

The ability of an anionic synthetic polymer and a non-ionic polymer to viscosify a brine was compared to that of a CP. Three samples, designated Samples 5-7, were prepared. Sample 5 comprised poly-DADMAC and was similar to Sample 1 from Example 1. Sample 6 was prepared using 5 lb/BBl acrylamide-AMPS copolymer (i.e., an anionic synthetic polymer), which is commercially available from Drilling Specialties Company. Specifically, 140 g of $CaCl_2$ was added to 210 g of deionized water and stirred until the fluid became translucent. Next, 3.57 g of acrylamide-AMPS was slowly added until the acrylamide-AMPS copolymer was fully dissolved. Sample 7 was prepared using 2.5 lb/BBl NATROSOL HHX, which is a hydroxyethyl cellulose (HEC) non-ionic copolymer commercially available from Hercules Incorporated. Specifically, 2 g of HEC was added to 280 ml of an 11.6 ppg $CaCl_2$ brine. The final concentrations of brine were the same in Samples 5-7. The samples were allowed to hydrate overnight and then Theological testing was performed. The results are shown in FIG. 4.

Figure 4:
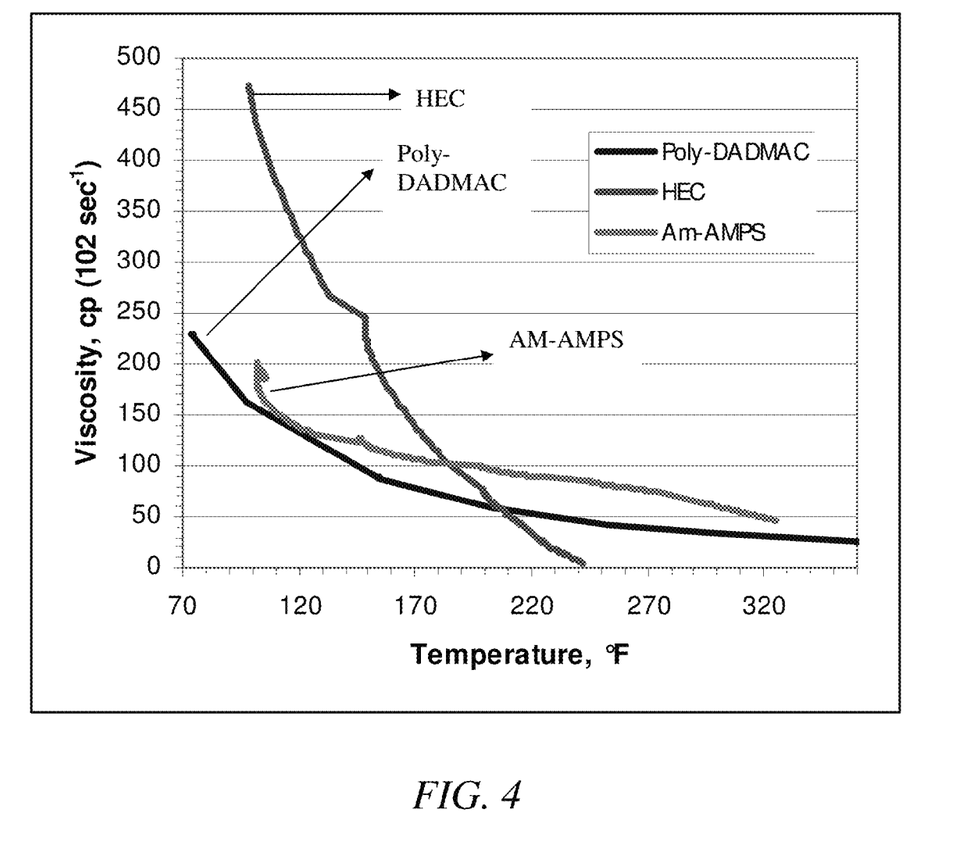
FIG. 4 is a plot of viscosity as a function of temperature for the samples from Example 3.

Referring to FIG. 4, the viscosity of Samples 6 and 7 at 100° F. was 189 cp (102 $sec^{-1}$) and 460 cp (102 $sec^{-1}$) respectively. The acrylamide-AMPS copolymer was less efficient at thickening the $CaCl_2$ brine since it produced lower viscosity at twice the polymer loading. Sample 7 produced higher viscosity than Sample 5 only up to 205° F. The low viscosity observed for Sample 7 at 240° F. is typical of HEC performance, which normally limits its utility to temperatures below 240° F. The viscosity of Sample 6 was higher than Sample 5 throughout the test. However, the acrylamide-AMPS copolymer gelled during cool down, which may potentially cause formation damage and restrict oil and gas production. In contrast, the CP used in Sample 5 demonstrated the ability to thicken $CaCl_2$ brine up to 350° F. and was able to maintain its solubility after exposure to such temperature ranges.

Example 4

The ability of a CPBC to suspend solids was investigated. The CP used was FLOQUAT FL3249, which is a polyamine commercially available from SNF Floerger. Sample 8 was prepared by adding 6 g of FLOQUAT FL3249 into 81 g of deionized water. Next, 0.1 g of calcium hydroxide was added to adjust the pH to about 8.5 and 56 g of $CaCl_2$ was added to bring the final brine density up to 11.6 ppg. The fluid was cooled to ambient temperature. 13.4 g of $CaCO_3$ was then added to 60 ml of the fluid and stirred until it became homogenous. The $CaCO_3$ was precipitated chalk, which is commercially available from Fisher Scientific. Rheological testing of the sample was then performed and the results are presented in Table 3.

TABLE 3

| Temperature (° F.) | Sample 8 Viscosity (2 sec$^{-1}$) | Sample 8 Viscosity (170 sec$^{-1}$) |
|---|---|---|
| 78 | 648 | 85 |
| 100 | 696 | 67 |
| 150 | 768 | 46 |
| 200 | 576 | 36 |
| 250 | 432 | 16 |
| 300 | 456 | 15 |
| 350 | 504 | 15 |

During heating, Sample 8 showed normal thermal thinning. At each test temperature, Sample 8 exhibited considerable shear thinning, as shown by the contrast between viscosity at 2 sec$^{-1}$ and at 170 sec$^{-1}$. The relatively high viscosity at the low shear rate indicated suspension capability. The suspension capability was further confirmed after Sample 8 was cooled. The cooled Sample 8 was homogenous and there was no evidence of precipitation or sedimentation of calcium carbonate.

Example 5

Figure 5:
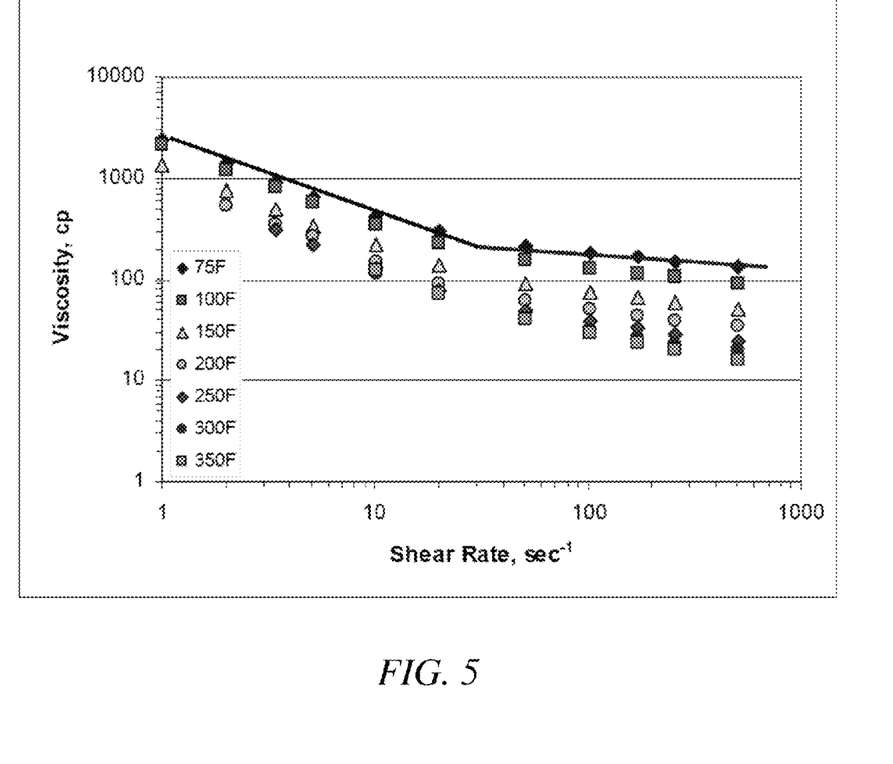
FIG. 5 is a plot of viscosity as a function of shear rate for the samples from Example 5.

The Theological properties of a CP in $CaCl_2$ brine were investigated, and compared to a CP in $CaCl_2$ brine containing $CaCO_3$. Sample 9 was prepared from 10.5 lb/BBl poly-DADMAC in 11.6 ppg $CaCl_2$ in a manner similar to that used in Example 1. The fluid pH was adjusted to 8.4 using 0.5 lb/BBl calcium hydroxide. Rheological testing was performed and the results are shown in Table 4 and FIG. 5, which is a plot of viscosity as a function of shear rate at 350° F.

TABLE 4

| Temperature (° F.) | n' | K' | Viscosity (1 sec$^{-1}$) | Viscosity (40 sec$^{-1}$) | Viscosity (100 sec$^{-1}$) | Viscosity (170 sec$^{-1}$) |
|---|---|---|---|---|---|---|
| 78 | 0.7707 | 0.0128 | 614 | 264 | 214 | 189 |
| 100 | 0.7677 | 0.0090 | 429 | 182 | 147 | 130 |
| 150 | 0.7786 | 0.0045 | 216 | 96 | 78 | 69 |
| 200 | 0.7605 | 0.0033 | 158 | 65 | 53 | 46 |
| 250 | 0.7655 | 0.0024 | 113 | 48 | 38 | 34 |
| 300 | 0.7573 | 0.0019 | 92 | 38 | 30 | 26 |
| 350 | 0.7839 | 0.0014 | 69 | 31 | 25 | 23 |

The results demonstrated that at each temperature, Sample 9 displayed a higher viscosity at the lower shear rate of 1 sec$^{-1}$ than at the higher shear rate of 170 sec$^{-1}$. In addition, as the temperature increased to 350° F., the viscosity of Sample 9 decreased. Thus, Sample 9 was able to maintain its shear thinning behavior at temperatures of up to 350° F.

Sample 10 was prepared using 80 ml of Sample 9, by adding 20 lb/BBl of powdered $CaCO_3$. Rheological testing was then performed and the results are presented in Table 5.

TABLE 5

| Temperature (° F.) | n' | K' | Viscosity (1 sec$^{-1}$) | Viscosity (40 sec$^{-1}$) | Viscosity (100 sec$^{-1}$) | Viscosity (170 sec$^{-1}$) |
|---|---|---|---|---|---|---|
| 78 | 0.6809 | 0.0244 | 1,170 | 361 | 269 | 227 |
| 100 | 0.6373 | 0.0221 | 1,057 | 277 | 199 | 164 |
| 150 | 0.5321 | 0.0214 | 1,024 | 182 | 119 | 93 |
| 200 | 0.4525 | 0.0243 | 1,161 | 154 | 93 | 70 |
| 250 | 0.4146 | 0.0249 | 1,192 | 138 | 80 | 59 |
| 300 | 0.4063 | 0.0233 | 1,117 | 125 | 73 | 53 |
| 350 | 0.3837 | 0.0249 | 1,190 | 123 | 70 | 50 |

The results demonstrated that at ambient temperature, the addition of $CaCO_3$ (Sample 10) had a greater effect on the low shear rate of 1 sec$^{-1}$ than at high shear rate of 170 sec$^{-1}$. The results suggested that, Sample 10 is more shear thinning than Sample 9. Without wishing to be limited by theory, there may be a relatively weak interaction between poly-DADMAC and $CaCO_3$. Sample 10 showed expected thermal thinning at high shear rate of 170 sec$^{-1}$ and its viscosity at low shear rate of 1 sec$^{-1}$ was relatively stable between 78° F. and 350° F. The results suggested the interaction between poly-DADMAC and suspended $CaCO_3$ was sufficiently strong to resist the effects of increased temperature but could be disrupted mechanically. Furthermore, the ability of Sample 10 to hold solids ($CaCO_3$) in suspension is maintained throughout this temperature range.

Figure 6:
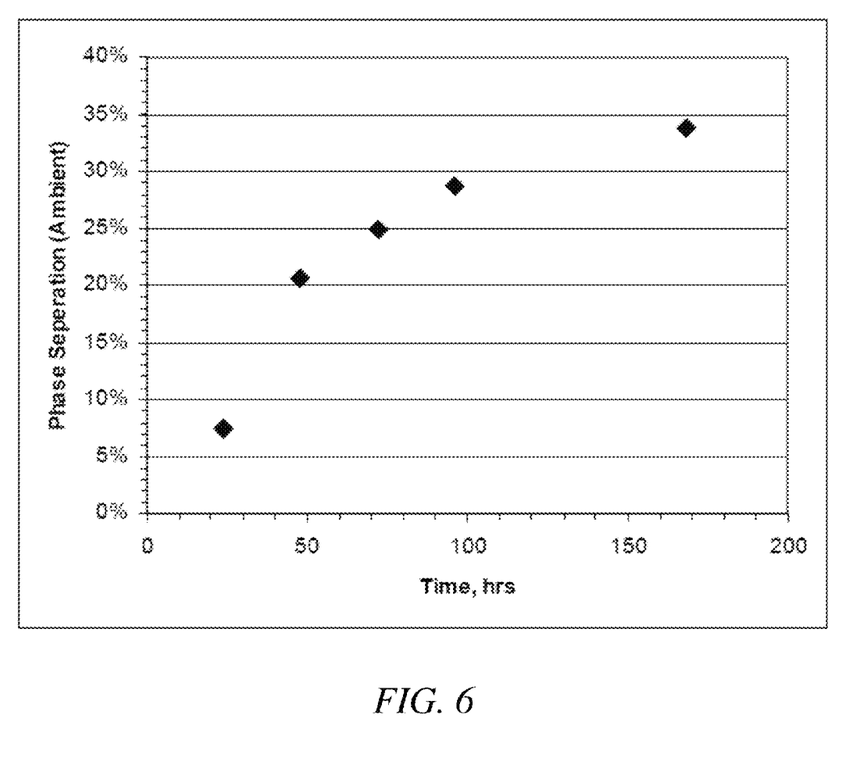
FIG. 6 is a plot of degree of phase separation as a function of time for the samples from Example 5.

A static aging test was also performed on Sample 10 by monitoring the degree of phase separation over 168 hours at ambient temperature (75° F.) and at 250° F. 10 ml portions of Sample 10 were placed into two glass vials and sealed. One vial was placed at ambient temperature and the other vial was placed in an oven at 250° F. The results are shown in Table 6 and FIG. 6, which is a plot of % phase separation at 75° F. as a function of time.

TABLE 6

| Time (hours) | % settling at 75° F. | % settling at 250° F. |
|---|---|---|
| 24 | 8% | 3% |
| 48 | 21% | 3% |
| 72 | 25% | 3% |
| 96 | 29% | 3% |
| 168 | 34% | 3% |

The results demonstrated that during the experiment, there was no evidence of particle sedimentation. The $CaCO_3$ remained in suspension in Sample 10. There was evidence of slumping in Sample 10 where clear brine separated to the surface as a distinct layer. In the 168 hours of static aging test at 250° F., only 3% of Sample 10 separated to the surface as clear brine.

Example 6

Figure 7:
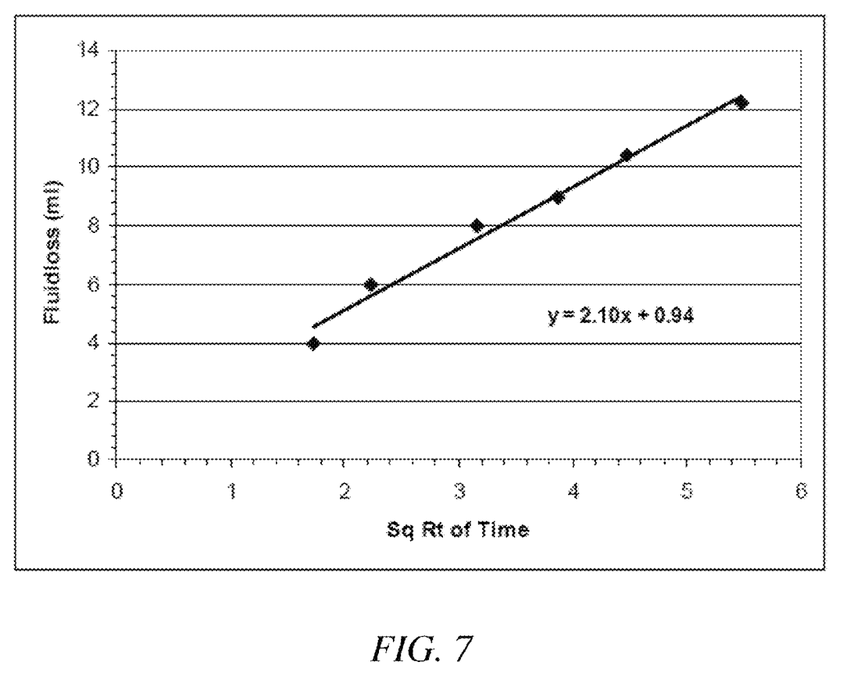
FIG. 7 is a plot of fluid loss as a function of square root of time for the samples from Example 6.

The ability of a CP to prevent fluid loss in $CaCl_2$ brine comprising solids was investigated. Sample 11 was prepared from 10.5 lb/BBl poly-DADMAC in 11.6 ppg $CaCl_2$ brine and 25 lb/BBl $CaCO_3$ using similar procedure as described previously. Fluid loss experiments were conducted at a temperature of 250° F. and a nitrogen pressure of 500 psi, as described in API RP-13B. The results are shown in Table 7 and FIG. 7.

TABLE 7

| Time (minutes) | Filtrate Volume (ml) |
| --- | --- |
| 3 | 4 |
| 5 | 6 |
| 10 | 8 |
| 15 | 9 |
| 20 | 10.4 |
| 30 | 12.2 |

The results showed that a total of 12 ml of filtrate was collected in the 30 minute test period, which demonstrated the ability of poly-DADMAC to prevent fluid loss when used in conjunction with calcium carbonate. After the test, Sample 10 was removed and there was no evidence of sedimentation or cohesive filtercake development on the surface of the filter paper.

Example 7

Figure 8:
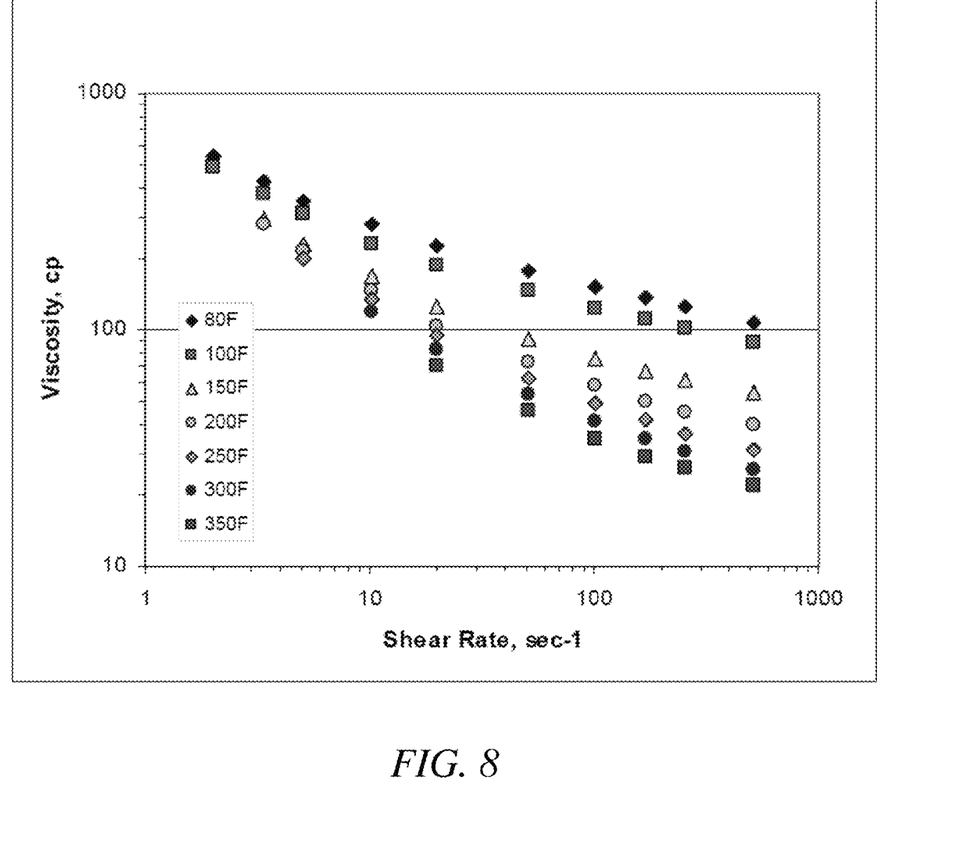
FIG. 8 is a plot of viscosity as a function of shear rate for the samples from Example 7.
Figure 9:
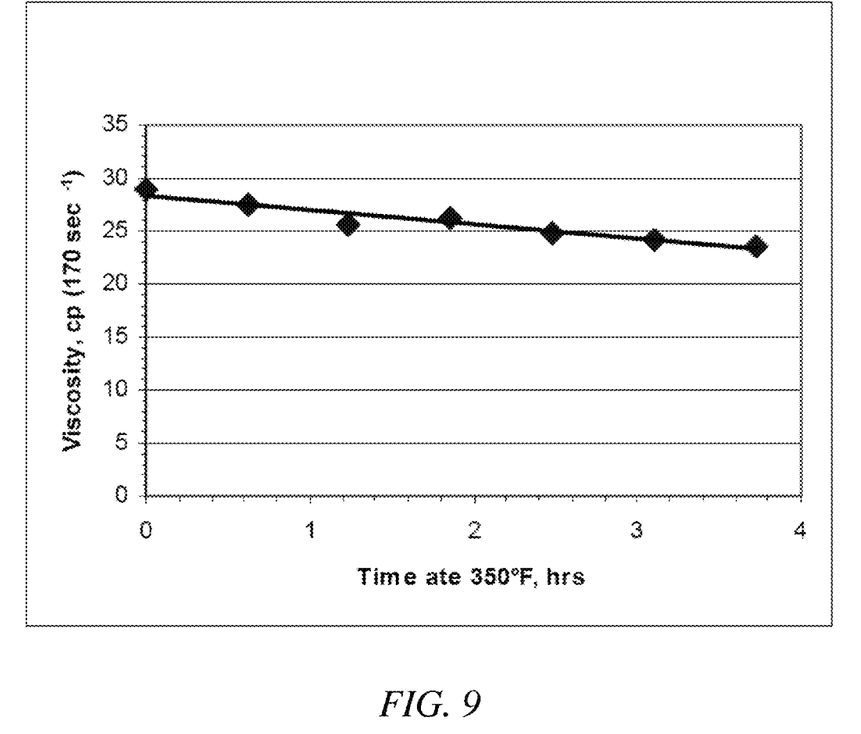
FIG. 9 is a plot of viscosity as a function of time at 350° F. for the samples from Example 7.

The Theological properties of a CP in $CaBr_2$ brine were investigated. Sample 12 was prepared from 10.5 lb/BBl poly-DADMAC in 14.2 ppg $CaBr_2$ using similar procedure as described previously; the pH of the sample was adjusted to about 8.2 and Theological testing was performed. The results are shown in Table 8 and FIGS. 8 and 9. FIG. 8 is a plot of viscosity as a function of shear rate and FIG. 9 is a plot of viscosity as a function of time at 350° F.

TABLE 8

| Temperature (° F.) | n' | K' | Viscosity (1 sec$^{-1}$) | Viscosity (40 sec$^{-1}$) | Viscosity (100 sec$^{-1}$) | Viscosity (170 sec$^{-1}$) |
| --- | --- | --- | --- | --- | --- | --- |
| 78 | 0.7175 | 0.0121 | 579 | 204 | 158 | 136 |
| 100 | 0.6983 | 0.0108 | 519 | 170 | 129 | 110 |
| 150 | 0.6628 | 0.0080 | 385 | 111 | 82 | 68 |
| 200 | 0.6065 | 0.0081 | 388 | 91 | 63 | 51 |
| 250 | 0.6227 | 0.0062 | 297 | 74 | 52 | 43 |
| 300 | 0.6058 | 0.0057 | 272 | 64 | 44 | 36 |
| 350 | 0.6387 | 0.0041 | 195 | 52 | 37 | 31 |

The results demonstrated that the Theological performance of poly-DADMAC in $CaBr_2$ brine was similar to poly-DADMAC in $CaCl_2$ brine, with shear thinning behavior maintained up to 350° F. In addition, the thermal stability of Sample 12 was tested by holding the sample at a shear rate of 170 sec$^{-1}$ and a temperature of 350° F. for four hours. The results are shown in FIG. 9. The results demonstrated that the viscosity of Sample 12 decreased from about 29 cp to about 24 cp indicating the thermal stability of Sample 12.

Example 8

The rheological properties of a CP in $ZnBr_2$ brine were investigated. Sample 13 was prepared from 10.5 lb/BBl poly-DADMAC in 19.2 ppg $ZnBr_2$ and rheological testing was performed. The results are presented in Table 9.

TABLE 9

| Temperature (° F.) | n' | K' | Viscosity (1 sec$^{-1}$) | Viscosity (40 sec$^{-1}$) | Viscosity (100 sec$^{-1}$) | Viscosity (170 sec$^{-1}$) |
| --- | --- | --- | --- | --- | --- | --- |
| 80 | 0.8390 | 0.0127 | 607 | 335 | 289 | 265 |
| 150 | 0.9083 | 0.0026 | 126 | 90 | 82 | 78 |

TABLE 9-continued

| Temperature (° F.) | n' | K' | Viscosity (1 sec$^{-1}$) | Viscosity (40 sec$^{-1}$) | Viscosity (100 sec$^{-1}$) | Viscosity (170 sec$^{-1}$) |
| --- | --- | --- | --- | --- | --- | --- |
| 200 | 0.9218 | 0.0016 | 75 | 56 | 52 | 50 |
| 250 | 0.9619 | 0.0009 | 44 | 38 | 37 | 36 |
| 300 | 0.9599 | 0.0007 | 35 | 30 | 29 | 28 |
| 350 | 0.9989 | 0.0005 | 22 | 22 | 22 | 22 |

Example 9

Figure 10:
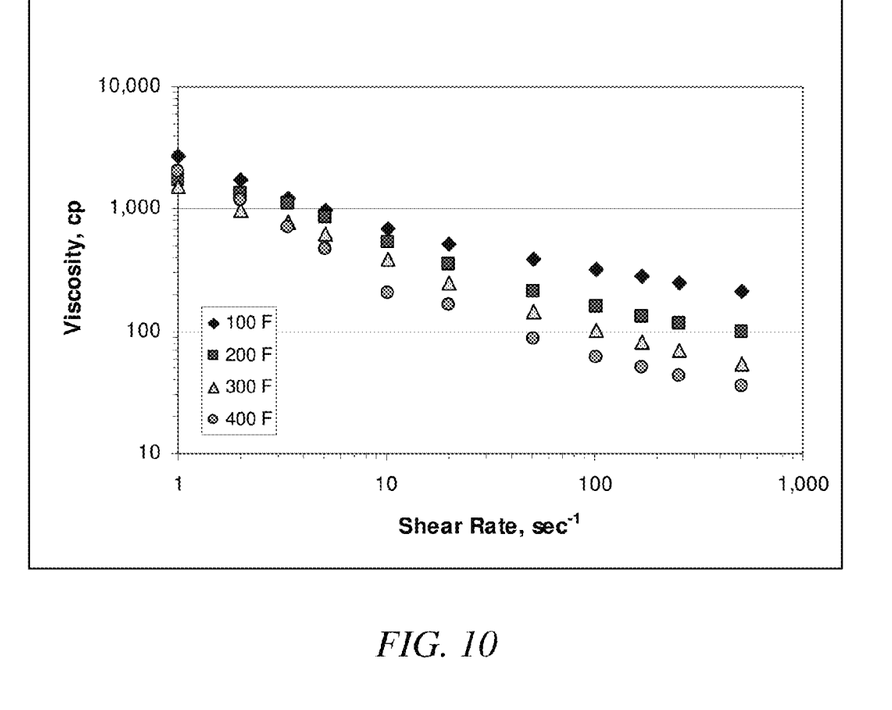
FIG. 10 is a plot of viscosity as a function of shear rate for the samples from Example 9.

The rheological properties of a CP in $CaCl_2$ brine at higher solids loading were investigated. Sample 14 was prepared from 7 lb/BBl poly-DADMAC in 11.6 ppg $CaCl_2$ brine at 78 lb/BBl $CaCO_3$ and rheological testing was performed at 100° F., 200° F., 300° F., and 400° F. the results are shown in FIG. 10.

The results suggested that poly-DADMAC appears to interact synergistically with the suspended solids (e.g., $CaCO_3$). This interaction leads to enhanced viscosity and shear thinning characteristics that were maintained at up to 400° F.

While embodiments of the disclosure have been shown and described, modifications thereof can be made without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure. The discussion of a reference is not an admission that it is prior art to the present disclosure, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method comprising:
placing a wellbore servicing fluid comprising a cationic polymer, a brine, and a solid into a wellbore, wherein the cationic polymer has a molecular weight of from about 300,000 Daltons to about 10,000,000 Daltons; wherein the brine has a density of from about 8.4 lb/gal to about 19.2 lb/gal; wherein the solid comprises a weighting agent comprising barite, hematite, ilmenite, iron carbonate, magnesium carbonate, calcium carbonate, or combinations thereof; and wherein the wellbore servicing fluid displays shear thinning rheology at a shear rate of from about 3 $sec^{-1}$ to about 300 $sec^{-1}$ and a temperature of from about 75° F. to about 500° F.

2. The method of claim 1, wherein the cationic polymer comprises a polyamine, a poly (allylamine), a quarternary amine, a polyalkyl ammonium halide, a poly allyl alkyl ammonium halide, a poly diallyl dimethyl ammonium chloride, a polyvinyl pyrrolidone, a poly vinylimidazole, a copolymer of vinylamine and allylamine, a copolymer of acrylamide and allylamine, a poly di-allyl dimethyl ammonium chloride homopolymer (poly-DADMAC), a poly DADMAC-co-allyl amine, a poly DADMAC-co-vinylpyrrolidone, a poly DADMAC-co-vinylimidazole, a poly DADMAC-co-acrylamide, polyvinylamine, a vinylpyrrolidone-co-methacrylamide-co-vinylimidazole, or combinations thereof.

3. The method of claim 1, wherein the cationic polymer comprises a poly di-allyl dimethyl ammonium chloride homopolymer or copolymer.

4. The method of claim 1, wherein the cationic polymer is not crosslinked.

5. The method of claim 1, wherein the cationic polymer is present in the wellbore servicing fluid in an amount of from about 0.5 lb/BBl to about 15 lb/BBl based on the total weight of the wellbore servicing fluid.

6. The method of claim 1, wherein the brine comprises sodium bromide (NaBr), calcium bromide ($CaBr_2$), zinc bromide ($ZnBr_2$), potassium bromide (KBr), sodium chloride (NaCl), calcium chloride ($CaCl_2$), zinc chloride ($ZnCl_2$), potassium chloride (KCl), or combinations thereof.

7. The method of claim 1, wherein the brine is present in the wellbore servicing fluid in an amount of from about 95 vol. % to about 99.8 vol. % based on the total volume of the wellbore servicing fluid.

8. The method of claim 1, wherein the wellbore servicing fluid maintains a viscosity of from about 100 centipoise to about 40,000 centipoise at a shear rate of from about 0.1 $sec^{-1}$ to about 10 $sec^{-1}$ at a temperature of from about 75° F. to about 500° F.

9. The method of claim 1 further comprising mixing the cationic polymer, the brine, and the solid to form the wellbore servicing fluid.

10. The method of claim 1, wherein the solid is present in the wellbore servicing fluid in an amount of from about 1 lb/BBl to about 400 lb/BBl based upon the total volume of the wellbore servicing fluid.

11. The method of claim 1, wherein the solid comprises calcium carbonate.

12. The method of claim 1, wherein the brine is present in an amount of from about 53 vol. % to about 99.6 vol. % based on total volume of the wellbore servicing fluid.

13. The method of claim 1, wherein the wellbore servicing fluid has a degree of phase separation of from about 0% to about 60%.

14. The method of claim 1, wherein the wellbore servicing fluid has fluid loss of from about 0.1 ml to about 60 ml as determined in accordance with API RP13B.

15. The method of claim 1, wherein the wellbore servicing fluid forms a stable suspension.

16. The method of claim 1, wherein the wellbore servicing fluid is a completion fluid, a work-over fluid, a spacer fluid, a liquid plug or combinations thereof.

17. The method of claim 1, wherein the wellbore servicing fluid is a drilling fluid, a gravel packing fluid, a fracturing fluid, an acidizing fluid, a fluid loss control fluid, a suspension agent or combinations thereof.

18. The method of claim 1 further comprising:
servicing the wellbore with the wellbore servicing fluid; and
extracting oil from the wellbore after said servicing.

19. A wellbore servicing fluid comprising a cationic polymer, a brine, and a weighting agent comprising barite, hematite, ilmenite, iron carbonate, magnesium carbonate, calcium carbonate, or combinations thereof; wherein the brine has a density of from about 8.4 lb/gal to about 19.2 lb/gal; and wherein the wellbore servicing fluid displays shear thinning rheology at a shear rate of from about 3 $sec^{-1}$ to about 300 $sec^{-1}$ and a temperature of from about 75 OF to about 500° F.

20. The wellbore servicing fluid of claim 19, wherein the cationic polymer comprises a polyamine, a poly (allylamine), a quarternary amine, a polyalkyl ammonium halide, a poly allyl alkyl ammonium halide, a poly diallyl dimethyl ammonium chloride, a polyvinyl pyrrolidone, a poly vinylimidazole, a copolymer of vinylamine and allylamine, a copolymer of acrylamide and allylamine, a poly di-allyl dimethyl ammonium chloride homopolymer (poly-DADMAC), a poly DADMAC-co-allyl amine, a poly DADMAC-co-vinylpyrrolidone, a poly DADMAC-co-vinylimidazole, a poly DADMAC-co-acrylamide, polyvinylamine, a vinylpyrrolidone-co-methacrylamide-co-vinylimidazole, or combinations thereof.

21. The wellbore servicing fluid of claim 1, wherein the fluid acts as a non-Newtonian fluid.

* * * * *